(12) United States Patent
Tolani

(10) Patent No.: US 6,568,512 B1
(45) Date of Patent: May 27, 2003

(54) CORROSION RESISTANT CAST-IN INSERT EXCITER RING

(75) Inventor: Nirmal M. Tolani, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/146,777

(22) Filed: May 16, 2002

(51) Int. Cl.$^7$ ............................................. F16D 65/12
(52) U.S. Cl. ............................... 188/218 XL; 188/18 R
(58) Field of Search ............................ 188/18 A, 18 R, 188/181 A, 181 R; 301/105.1; 164/111; 324/173

(56) References Cited

U.S. PATENT DOCUMENTS

| | | | |
|---|---|---|---|
| 5,129,741 A | | 7/1992 | Deane |
| 5,263,900 A | * | 11/1993 | Stimson .................. 188/181 R |
| 5,332,065 A | * | 7/1994 | Steele et al. .............. 188/18 R |
| 5,569,543 A | | 10/1996 | Schaffer, Jr. et al. |
| 5,669,679 A | * | 9/1997 | Hammoud et al. ......... 303/165 |
| 5,739,684 A | * | 4/1998 | Burns ........................ 324/173 |
| 5,964,022 A | | 10/1999 | Mann et al. |
| 6,167,354 A | * | 12/2000 | Maleki et al. .............. 702/147 |
| 6,302,246 B1 | | 10/2001 | Näumann et al. |

FOREIGN PATENT DOCUMENTS

DE 42 37 655 A 1 11/2002

* cited by examiner

*Primary Examiner*—Christopher P. Schwartz
(74) *Attorney, Agent, or Firm*—Jeffrey P. Calfa; Neil T. Powell; Dennis Kelly Sullivan

(57) ABSTRACT

A rotational element for a wheel comprises a cast iron segment and an anti-lock brake system exciter ring adhering to the cast iron segment as a cast-in insert. The anti-lock brake system exciter ring is made of a material having greater corrosion resistance and a higher melting point than the cast iron. The exciter ring includes at least a first tang penetrating the cast iron segment. The exciter ring is preferably made from ferritic stainless steel. For disk brake systems the rotational element serves as a disk brake rotor. In vehicles using drum brakes the rotational element serves as a wheel hub.

7 Claims, 6 Drawing Sheets

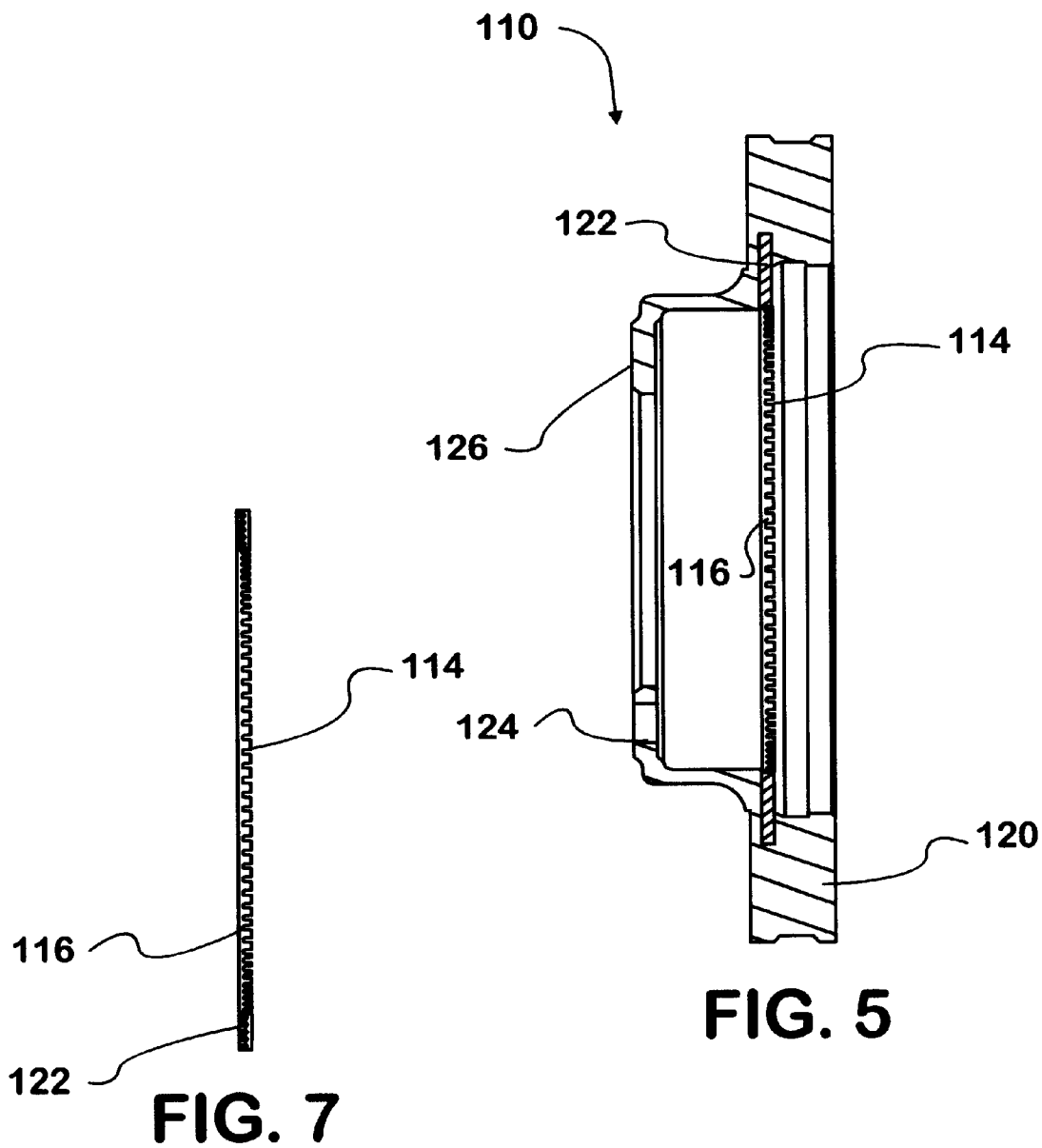

CORROSION RESISTANT CAST-IN INSERT EXCITER RING

BACKGROUND OF THE INVENTION

1. Field of the Invention

The present invention relates to motor vehicle brake systems and more particularly to a corrosion resistant cast-in insert ABS exciter ring integrated with either a disk rotor or, for drum brake systems, a wheel hub.

2. Description of the Problem

Brake units for motor vehicles should provide smooth braking with reasonable service life. This need has been met with disk brake rotors made from relatively inexpensive gray iron castings. Gray iron is however highly susceptible to corrosive attack, particularly in the operating environment of vehicles where brake components are open to the air, subject to substantial transient heating and exposed to water and salt water spray. In regular use, the working surfaces of the disks are rubbed clean by contact with the disk pads, which are typically made of a composite material and which rub off corroded areas. However other areas of the brake disks are not swept by the brake pads and thereby cleaned of corrosion. Prior to anti-lock braking systems, such concerns were not paramount with brakes which were frequently in use, since the rotor is a regularly replaced part and the remaining areas subject to attack were non-critical.

With the advent of anti-lock braking systems other sections of the disk brake rotor can take on importance. Among other sections of a typical disk rotor of mechanical importance is an anti-lock brake system exciter ring which has typically been cast as one piece with the rotor. The exciter ring is a cylindrical section of the rotor having a common axis of rotation with the rotor. A plurality of teeth are positioned in a ring, flat in the plane of rotation of the rotor and outwardly oriented on the exterior of the ring to pass closely by a stationary sensor. The stationary sensor is a variable reluctance sensor which generates an electrical pulse train as a function of the varying magnetic flux leakage between the sensor head and the exciter ring. The frequency of the resulting electrical pulse train indicates the rotational speed of the wheel on which the rotor is mounted. The generation of clean pulse train is greatly aided by having teeth of uniform shape, size and spacing. Corrosion can greatly compromise all of these factors, resulting in difficulty in detecting the passage of teeth and gaps and resulting in a corrupted pulse train.

It is known that coating parts suppresses corrosion. Corrosion protection coatings can be used such as that described in U.S. Pat. No. 5,569,543 and those supplied by Magni Corp., including the Magni 109 and Magni 111 coatings. Such coatings can be easily compromised when applied to exciter rings since the sensor usually needs to pass within very close proximity to the teeth and, consequently, the chance exists for removal of the coating from the teeth, which again leaves the teeth exposed to corrosive agents. In addition, such coatings are relatively expensive and their long term durability under all of the widely varying conditions of vehicle use is not well known.

It is known to make disk rotors out of more than one material, although no application of such an approach to solving the problems of ABS exciter rings is known to the inventor. German Laid Open Application 42 37 655 describes a brake disk for a motor vehicle disk brake system. The rotor comprises two abrasion rings, including an inner ring made of iron and an outer ring made of a composite fiber material. The rings are bonded to one another, preferably using rivets. The application mentions the possibility of casting the iron disk onto the composite fiber disk. The application is not directed primarily to corrosion problems but rather to improving weight balance, reducing the potential for cracking and reducing brake vibration.

The problem of corrosion of exciter rings for anti-lock brake systems is not limited to disk brake systems, but is also an issue with drum brakes. In drum brakes the exciter ring has not been an integral part of any part of the working brake, but rather has been a separate part press fitted on the end of a wheel hub. Such hubs are frequently made from nodular iron, which like gray iron is highly susceptible to corrosive attack. Improper control of the fitting process can result in exciter rings becoming displaced from an optimal position.

SUMMARY OF THE INVENTION

According to the invention there is provided a rotational element for a wheel comprising a cast iron segment and an anti-lock brake system exciter ring segment, which adheres to the cast iron segment as a cast-in insert. The anti-lock brake system exciter ring segment is made of a corrosion resistant, magnetic material having a higher melting point than the cast iron segment. The exciter ring includes at least one tang penetrating the cast iron segment. The exciter ring is preferably made from ferritic stainless steel where magnetic anti-lock brake sensors are to be used. For disk brake systems the rotational element serves as a disk brake rotor. In vehicles using drum brakes the rotational element serves as a wheel hub.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 is a cross sectional view of the disk rotor of FIG. 3 taken along section line A—A.

FIG. 7 is a cross sectional view of the disk rotor of FIG. 3 taken along section line C—C.

DETAILED DESCRIPTION OF THE INVENTION

Figure 1:
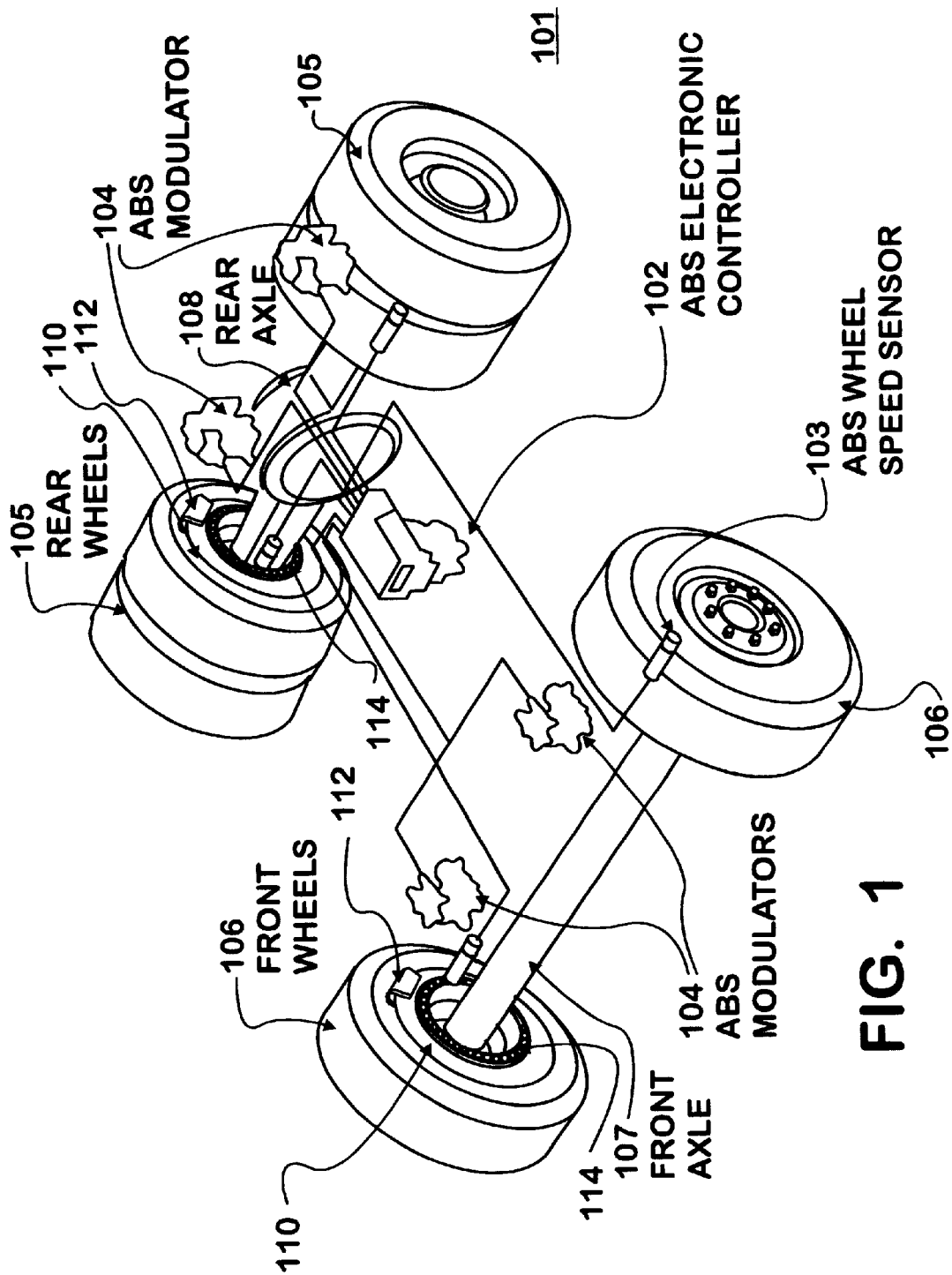
FIG. 1 is a schematic illustration of a vehicle equipped with anti-lock brake systems.

Referring to FIG. 1, system overview of a vehicle 101 equipped with an antilock brake systems (ABS) is shown without vehicle bodies. Vehicle 101 is illustrative of disk or drum brakes and has rear wheels 105 mounted on opposite outside ends of a rear axle 108. Front wheels 106 are similarly mounted from the opposite outside ends of a front axle 107. A wheel 106 or 105 may comprise one or two tires. Wheels 105 and 106 are mounted for rotation on axles 108 and 107, respectively.

Vehicle 101 in the FIG. 1 sketch shows disk brakes, which in turn include a disk rotor 110 and a caliper 112 on each of the four wheels. The ABS further includes exciter rings 114 associated with each disk rotor 110, ABS wheel speed sensors 103 positioned along the exciter rings 114, ABS modulators controlling the calipers 112 and an ABS electronic controller 102.

ABS wheel speed sensors 103 may sense wheel rotation in a variety of ways. In the subject embodiment this is accomplished by positioning a variable reluctance sensor so that it is stationary with respect to the exciter ring, which rotates as part of the disk rotor mounted to the wheel. The variable reluctance sensor has a cylindrical body, the central longitudinal axis of which is aligned with, and normal to, a sensing circle, that is the target for alignment of the sensor on the exciter ring. The moving magnetic material, which in the preferred embodiment resemble gear teeth laid out in a circle on a plane, pass in front of the stationary sensor, inducing a varying, cyclical voltage, the frequency of which is proportional to the angular velocity of the wheel.

The amplitude, or signal strength produced by the sensor system is a function in several variables, the most important of which is the gap between the tip of the sensor and the exciter ring. Larger gaps produce weaker signals. Corrosion has deleterious effects on both the amplitude and consistency of the electrical signal. Since corrosion acts to destroy the dimensional consistency of the exciter ring teeth, the electronic consistency of the signal is likewise compromised. In addition, corrosion increases the gap between the tip of the sensor and the exciter ring teeth, while simultaneously reducing the gap between the sensor tip and the bottoms of the gaps between the teeth, resulting in reduced amplitude of the resulting electrical signal. As corrosion progresses the amplitude and signal quality can be reduced such that they drop below the thresholds necessary for interpretation by ABS systems. This problem is particularly bad with exciter rings cast as one piece with the disk rotor. With drum brakes the exciter ring has been press fitted to a cast iron wheel hub. Such rings have been made of materials other than cast iron, but have been susceptible to loosening and falling off due to the nature of press-fit process.

Figure 2:
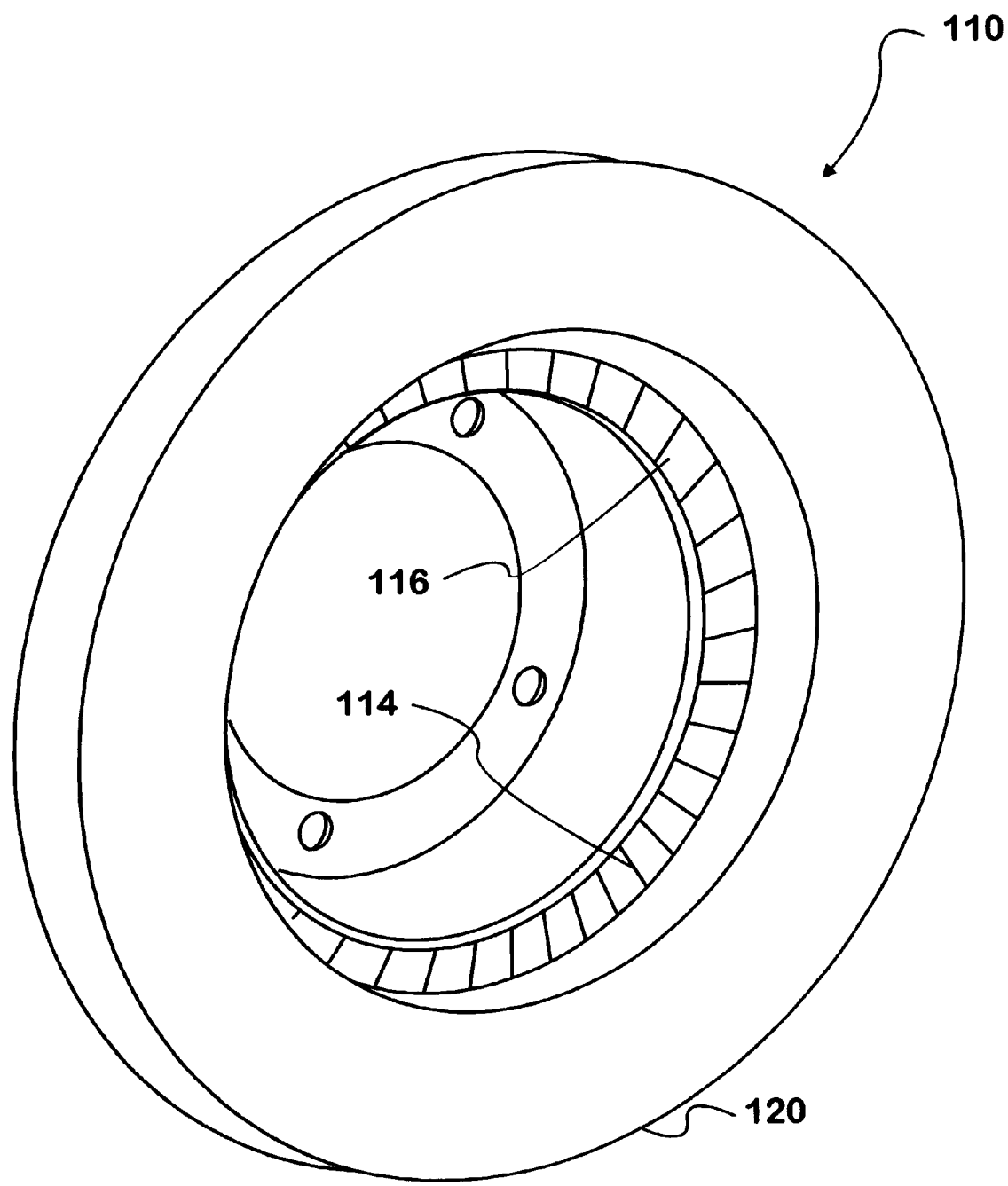
FIG. 2 is a perspective view of disk rotor incorporating the cast-in insert exciter ring of the preferred embodiment.

Referring now to FIG. 2 a disk brake rotor 110 comprising a brake rotor body 120, made from cast iron, and a cast-in insert exciter ring 114, which is made from a corrosion resistant magnetic material, preferably ferritic stainless steel. The material forming exciter ring 114 has a substantially higher melting point than iron so as to retain its integrity when molten iron comes into contact with the exciter ring during casting of the disk rotor 110. This allows the exciter ring 114 to be placed in a mold and the disk brake rotor 110 formed on it by casting the iron to form brake rotor body 120 into the mold after positioning of the exciter ring. The teeth 116 of exciter ring 114 lie in the plane of rotation of disk rotor 110.

Figure 4:
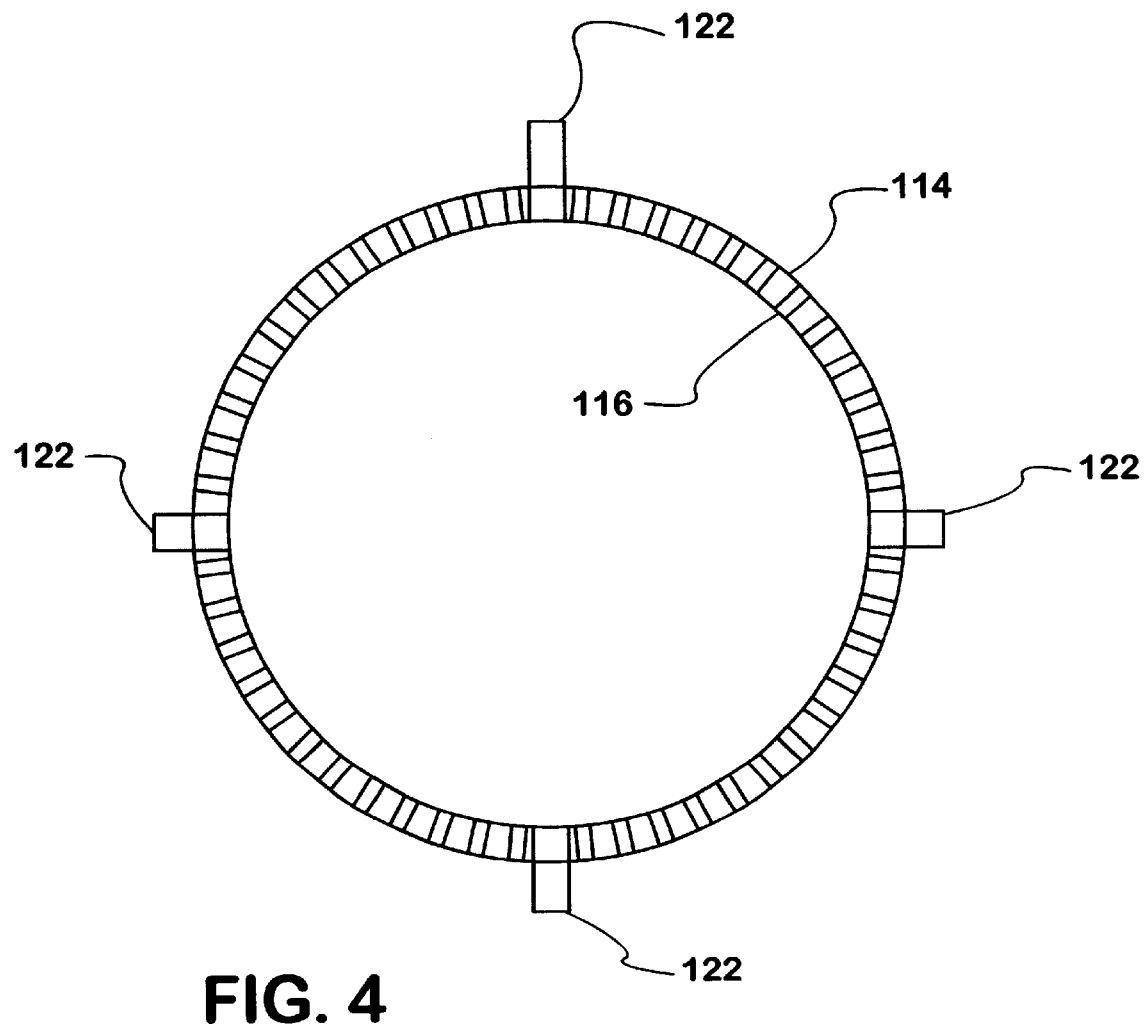
FIG. 4 is a plan view of an exciter ring for a disk rotor.

Referring to FIG. 4 a disk brake exciter ring 114 is illustrated in isolation. Exciter ring 114 is preferably flat on one side or corrugated with at least one tang 122, and preferably four tangs 122, extending outwardly from the outer circumference of the ring. For a flat ring the exciter ring teeth 116 comprise alternating raised and lowered areas on one major surface of the ring 114. For a corrugated ring the teeth 116 are the protruding portions of the ring side intended to face the sensor head. Teeth 116 extend radially from the center point of the ring on the intended axis of rotation of the ring and oriented to lie in the plane of rotation.

Figure 3:
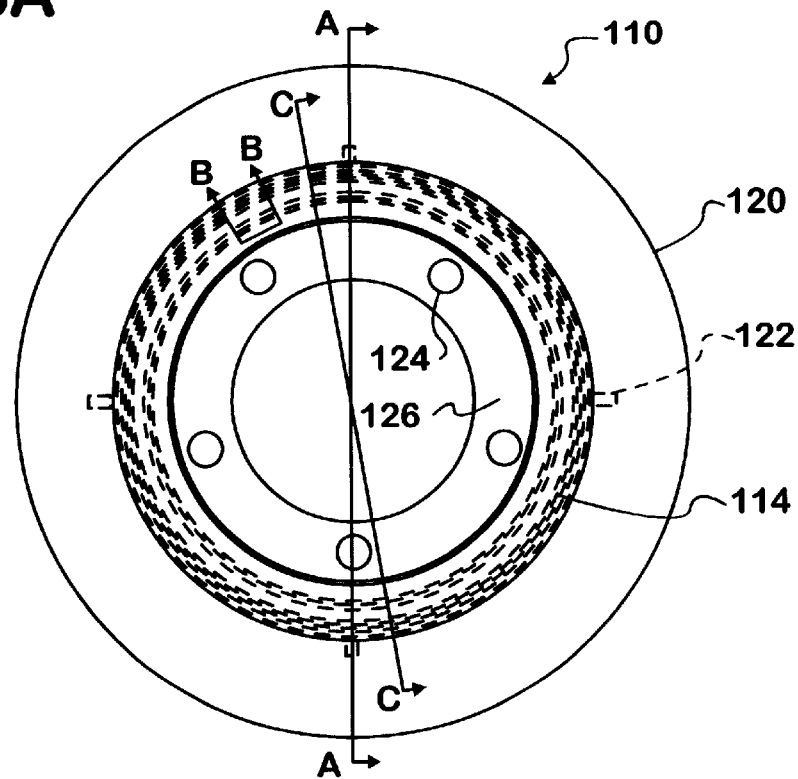
FIG. 3 is a plan view of the disk rotor.

Referring now to FIG. 3, a plan view of disk rotor 110 is used to indicate the locations of a series of section views taken along section lines A—A, B—B, and C—C, which are presented in FIGS. 5, 6A, 6B and 7, respectively. Exciter ring 114 is positioned between the braking surface 120 and an inner mounting flange 126. Holes 124 for mounting rotor 110 are provided through inner mounting flange 126. Tangs 122 penetrate the body of abrasion ring section 120 in a locking arrangement.

Referring to FIGS. 5 and 7, exciter ring 114 is presented in side elevation, first in situ on rotor body 120 and second in isolation. Tangs 122 extend outwardly from the ring of teeth 116 into the rotor body 120. Rotor body 120 and the ferritic stainless steel have an interface along the circumferential edge and one major surface of ring 114.

Figure 10:
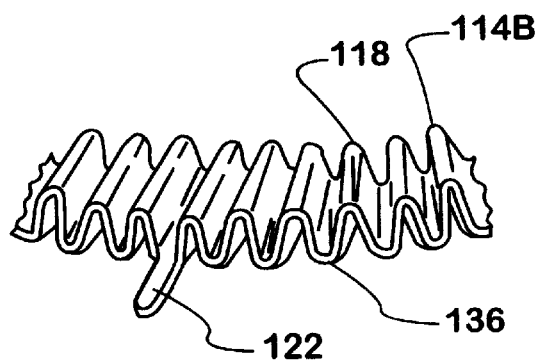
FIG. 10 is a perspective view of a section of a corrugated exciter ring shown in FIG. 6B.
Figure 6A:
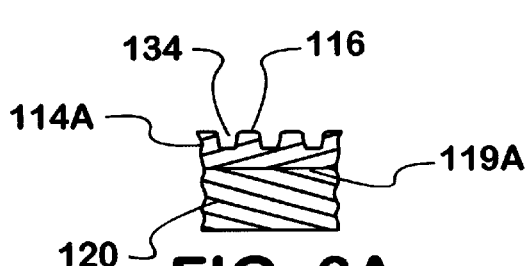
FIGS. 6A and 6B are alternate cross sectional views of the disk rotor of FIG. 3 taken along section line B—B.
Figure 6B:
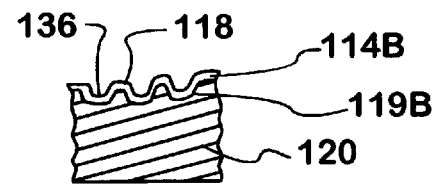

FIGS. 6A–B illustrate alternative profiles for an exciter ring taken along section line B—B, with FIG. 6A illustrating a flat sided ring 114A and FIG. 6B illustrating a corrugated profile ring 114B. For ring 114A teeth 116 alternate with grooves 134 on one face of the ring. The opposite major surface is flat along an interface 119A with rotor body 120. Ring 119A can be made by a variety of ways such as sintered metal, machining or casting. For corrugated ring 114B ridges 136 on the inner surface and 118 on the outer surface of the ring relative to the rotor body 120 form recesses and teeth, respectively. Ring 114B can be stamped from sheet metal to form the alternating ridges. Referring to FIG. 10, a section of ring 114B including a tang 122 is presented in perspective view.

Figure 8:
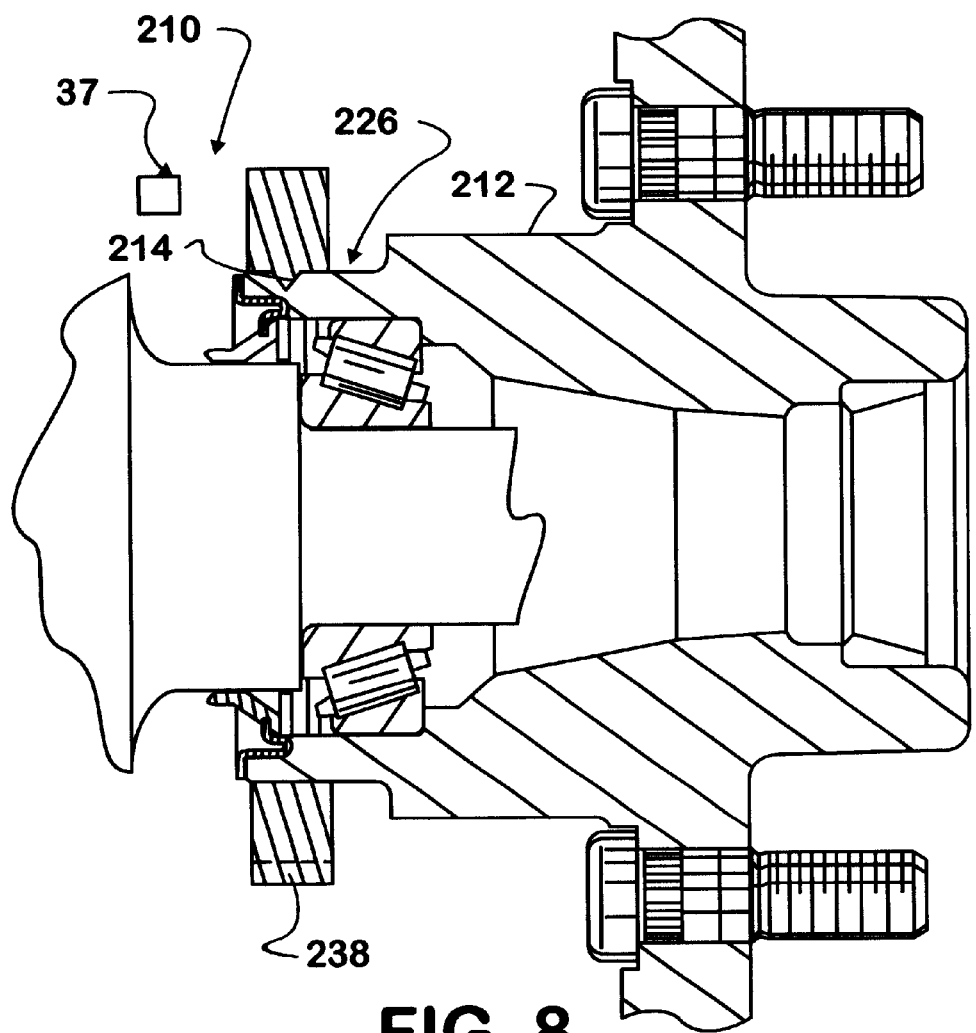
FIG. 8 is a cross sectional view of a wheel hub used with a drum brake equipped vehicle.
Figure 9:
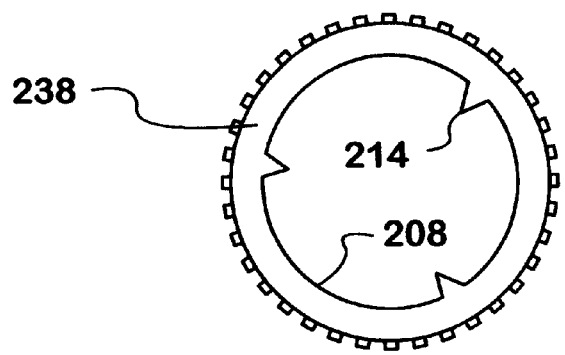
FIG. 9 is a plan view of a cast-in insert exciter ring from the wheel hub of FIG. 8.

FIGS. 8 and 9 illustrate application of the invention to a wheel hub assembly 210 usable with a drum brake equipped vehicle employing an anti-lock brake system. The inner surface cylindrical surface 208 of exciter ring 238 includes ring mounting tangs 214, which point inwardly toward the intend axis of rotation, which penetrate an end portion 226 of a cast iron hub member 212. Exciter ring 238 is corrosion resistant, magnetic material, preferably ferritic stainless steel and hub member 212 is generally made from ductile iron. In the prior art exciter rings were typically press fit to the wheel hubs, which, if not carefully done, can result in misalignment of the exciter rings or even eventual detachment of the rings. The positive mounting provided by the tangs 214 prevents such detachment.

While the invention is shown in only one of its forms, it is not thus limited but is susceptible to various changes and modifications without departing from the spirit and scope of the invention.

What is claimed is:

1. A brake system comprising:
   a cast iron rotor for rotation about an axis;
   an exciter ring made of a corrosion resistant, magnetically soft material having a melting point substantially higher than the cast iron rotor; and
   the cast iron rotor being formed on the exciter ring so that the cast rotor and the exciter ring adhere to one another to form a common structure which is symmetric about the axis.

2. A brake system as set forth in claim 1 wherein the exciter ring is made from ferritic stainless steel.

3. A brake system as set forth in claim 2 wherein the exciter ring further comprises at least a first tang penetrating the cast iron rotor.

4. A brake system element as set forth in claim 3, the exciter ring having a corrugated profile with ridges providing alternating teeth and grooves on one face of the exciter ring.

5. A mobile vehicle comprising:
- at least two axles with each axle having at least two wheels engaged thereto;
- an anti-lock brake electronic controller;
- an anti-lock brake sensor positioned with respect to the wheels engaged to each axle;
- each wheel for at least a first axle comprising a first cast iron rotor; and
- an anti-lock brake system exciter ring adhering to the first cast iron rotor as a cast-in insert to pass along the anti-lock brake sensor, the anti-lock brake system exciter ring being make of a magnetically soft material having a higher melting point and greater corrosion resistance than the cast iron rotor.

6. A mobile vehicle as set forth in claim 5, wherein each exciter ring includes at least a first tang penetrating the cast iron rotor.

7. A mobile vehicle as set forth in claim 6, wherein the exciter ring is made from ferritic stainless steel.

* * * * *